(12) United States Patent
Knudson et al.

(10) Patent No.: US 9,047,442 B2
(45) Date of Patent: Jun. 2, 2015

(54) PROVISIONING MANAGED DEVICES WITH STATES OF ARBITRARY TYPE

(75) Inventors: Dan A. Knudson, Clyde Hill, WA (US); James J. Simmons, Carnation, WA (US); Siddharth Bhai, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/526,494

(22) Filed: Jun. 18, 2012

(65) Prior Publication Data

US 2013/0340027 A1 Dec. 19, 2013

(51) Int. Cl.
G06F 21/00 (2013.01)
H04L 29/06 (2006.01)
H04L 12/24 (2006.01)
G06F 9/445 (2006.01)

(52) U.S. Cl.
CPC ............... *G06F 21/00* (2013.01); *H04L 63/20* (2013.01); *H04L 41/0806* (2013.01); *G06F 9/44505* (2013.01)

(58) Field of Classification Search
CPC . H04L 63/20; H04L 63/0227; G06F 21/6218; G06F 21/604
USPC .......................................................... 726/1
See application file for complete search history.

(56) References Cited

U.S. PATENT DOCUMENTS

| | | | |
|---|---|---|---|
| 6,397,336 B2* | 5/2002 | Leppek | 726/4 |
| 7,395,322 B2 | 7/2008 | Harvey et al. | |
| 7,499,936 B2 | 3/2009 | Bettendorf | |
| 8,028,329 B2 | 9/2011 | Whitcomb | |
| 2002/0147801 A1* | 10/2002 | Gullotta et al. | 709/223 |
| 2004/0167987 A1* | 8/2004 | Reese et al. | 709/238 |
| 2006/0206932 A1* | 9/2006 | Chong | 726/10 |
| 2006/0230124 A1* | 10/2006 | Belfiore et al. | 709/219 |
| 2007/0061264 A1* | 3/2007 | Yeung et al. | 705/51 |
| 2008/0005290 A1* | 1/2008 | Nykanen et al. | 709/222 |
| 2008/0071900 A1 | 3/2008 | Hecker et al. | |
| 2008/0320308 A1* | 12/2008 | Kostiainen et al. | 713/171 |
| 2009/0217362 A1* | 8/2009 | Nanda et al. | 726/5 |
| 2011/0078787 A1* | 3/2011 | Hamid | 726/19 |
| 2011/0107401 A1* | 5/2011 | Bhai et al. | 726/4 |
| 2013/0276076 A1* | 10/2013 | Gupta et al. | 726/5 |
| 2013/0340027 A1* | 12/2013 | Knudson et al. | 726/1 |

OTHER PUBLICATIONS

Bendahmane et al., "Grid computing security mechanisms: State-of-the-art", 2009, pp. 535-540.*

(Continued)

*Primary Examiner* — Yonas Bayou
(74) *Attorney, Agent, or Firm* — Timothy Churna; Kate Drakos; Micky Minhas

(57) ABSTRACT

Described is a technology by which a target machine (managed device) is provisioned with arbitrary states for subsequent communication with a central authority, in which the configuration provisioning of the device is decoupled from the collection of the provisioning data. In a provisioning phase, arbitrary state information for provisioning the managed device is obtained and packaged in a container. In a configuration phase, the container is accessed, and the arbitrary state information is unpackaged to apply state to the managed device. The target machine thus may be provisioned with arbitrary states without actively communicating with the central authority.

20 Claims, 9 Drawing Sheets

(56) References Cited

OTHER PUBLICATIONS

Yang et al., "Towards a trust management enabled identit metasystem", Apr. 2010, all pages.*

Eronen, et al., "Securing Ad Hoc Jini Services", In The 5th Nordic Workshop on Secure IT Systems, Oct. 2010, pp. 169-177.

"Afaria for iPhone/iPad", Retrieved on: Dec. 2, 2012, Available at: http://www.sybven.com/multisites/Sybven-en/images/stories/sybase_afaria_for_iphone_ipad_ds.pdf.

"BT Explorer Bluetooth Application", Retrieved on: Dec. 2, 2012, Available at: http://www.stonestreetone.com/btexplorer.cfm.

* cited by examiner

PROVISIONING MANAGED DEVICES WITH STATES OF ARBITRARY TYPE

BACKGROUND

Contemporary enterprises have many managed devices, e.g., computing machines. Each such device needs to be securely provisioned with various data and the like (e.g. a trust relationship, policy settings, and certificates), referred to as state information, or simply states, so that the device can join with and be securely managed from a centralized authority. For example, if the centralized authority is a domain controller (e.g. based upon Active Directory®), a managed device needs the appropriate states to join and be part of the domain.

Securely establishing states of arbitrary type between a managed device and a centralized authority heretofore depended on secure network connectivity between the managed device and the central authority at the time such states are established, e.g., the device needed to be coupled directly to the private enterprise network corresponding to the central authority. Further, the managed device needed to be running (booted).

This causes problems, in part because securely establishing states of arbitrary type for large sets of managed devices generates a heavy load on the centralized authority. Further, securely establishing such states is also prone to failures due to transient network states.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a target machine (managed device) is provisioned for subsequent communication with a central authority. Upon receiving a provisioning request, provisioning data related to the provisioning of the target machine is obtained, in which the provisioning data contains arbitrary state such as trust relationship-related data, certificate-related data and policy-related data. The provisioning data is packaged into a container that is accessible for configuring the target machine without additional communication with the central authority.

Further described is accessing the container, unpacking the provisioning data to obtain configuration data, and applying the configuration data to the target machine. The accessing of the container, unpacking of the provisioning data to obtain configuration data and applying of the configuration data may be independent of the provisioning of the data, that is, the target machine may be provisioned without actively communicating with the central authority.

In one aspect, a configuration framework is coupled to a managed device. The configuration framework is configured to process provisioning data contained in a container, including to invoke one or more configuration services. The one or more configuration services write state information corresponding to a plurality of states to a device storage of the managed device, including when the managed device is not actively communicating with a central authority, to provision the device for subsequent communication with the central authority.

In one aspect, a provisioning phase and an independent configuration phase are provided, in which a managed device need not be actively communicating with a central authority. In the provisioning phase, arbitrary state information for provisioning the managed device for subsequent communication with the central authority is obtained, and packaged in a container. In the configuration phase, the container is accessed, and the arbitrary state information is unpackaged to apply state to the managed device, to provision the managed device for subsequent communication with the central authority.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
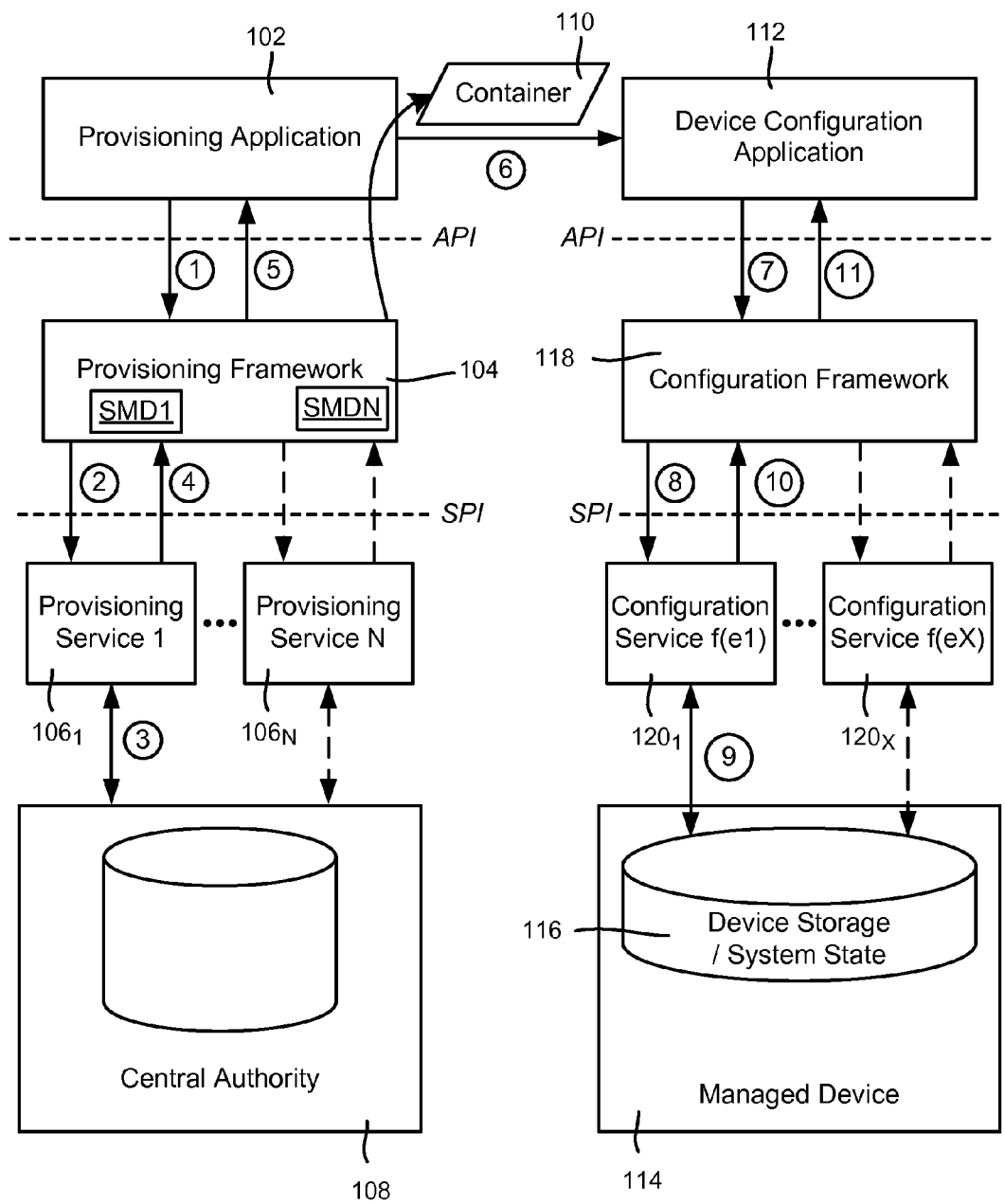
FIG. 1 is a block diagram showing example components in a provisioning phase that packages provisioning data for future provisioning of a managed device, and a decoupled configuration stage that later unpackages the provisioning data for provisioning the managed device.

Various aspects of the technology described herein are generally directed towards decoupling the establishment of states of arbitrary type (e.g. a trust relationship, policy, or certificates) between a managed device and a centralized authority from the application of those states to the managed device. In general, the technology allows a proxy to play the role of a managed device in state creation, and captures the resulting states in a container for storage and transportation. The subsequent application of the states to the managed device uses the container, any may occur in a manner that does not involve the centralized authority. Once provisioned with the appropriate states, which need not occur inside the corporate network, the managed device may securely couple to the central authority through any suitable network, including a public network.

Note that U.S. published patent application no. 20110107401, assigned to the assignee of the present invention and hereby incorporated by reference, is directed towards decoupling the process of establishing a trust relationship between a managed device and a central authority from the application of that state to the managed device. In general, a proxy plays the role of a managed device in state creation, with the state subsequently applied to the managed device in a manner that does not involve the centralized authority. While such decoupling is extremely useful, this technology only applies to trust relationship states (e.g., credentials to join the domain), and still needs direct connection of the managed device with the central authority via the central authority's private network before any further interaction between the managed device and the central authority can occur.

In contrast, as will be understood, managed devices may be provisioned with states of arbitrary type (e.g., certificates and policy settings such as Windows® registry keys, not just trust relationship states) as described herein in a decoupled manner, without needing to be coupled to the central authority via the private network. By allowing for states of arbitrary type, managed devices may be configured to securely connect to the central authority over a public network, thereby removing the need for any direct connection between the managed device and the central authority on the central authority's private network. Moreover, the provisioning of large sets of managed devices is enhanced through the isolation of common failure conditions and increased granularity of operations inherent in the phased approach described herein.

To this end, an extensible framework is provided for the secure establishment, capture, and aggregation of states of arbitrary type between a managed device and a centralized authority, using a proxy on behalf and instead of the managed device. An extensible, versioned container is used for the storage and transportation of one or many elements such as managed device state metadata of arbitrary types. Container characteristics may allow for encryption and compression of the contents.

The extensible framework provides for the secure consumption of containers and the installation of the constituent container elements in a manner that does not involve a centralized authority. System (e.g. framework) components may be delivered as container elements, including for just-in-time installation on managed devices. Reusable managed device state templates also may be used. Compilation and maintenance of container installation records on managed devices for the purposes of tracking and deinstallation is also facilitated.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, networking and device provisioning in general.

FIG. 1 shows an example general implementation/architecture in which managed device states are established in phases by one or more higher layer applications using managed device provisioning/configuration frameworks. Note that in FIG. 1, the labeled arrows one (1) through eleven (11) in FIG. 1, as well as the dashed arrows, show a general data/communications flow described below with reference to FIGS. 2-5. Note that the labeled arrow six (6) may represent any direct or indirect communication path, including via a cloud/public network (e.g. Internet) between a provisioning server/network and the device to be provisioned.

In FIG. 1, as part of a provisioning phase, a managed device provisioning component such as a provisioning application 102 uses a managed device provisioning framework 104 to facilitate the provisioning of states. In general, the managed device provisioning framework 104 provides the application 102 with an abstract view (via a suitable application programming interface (API) set represented by the dashed line) of various underlying provisioning services $106_1$-$106_N$ which are each coupled to a central authority 108. An SPI (Service Provider Interface) is similarly represented by a dashed line between the frameworks service providers to denote provider "plugability." Note that the central authority 108 may be a domain controller or the like (such as a certificate authority), and may comprise a single physical or virtual machine, a plurality of clustered machines (e.g., with a quorum mechanism), a set of distributed machines, and so forth.

In one implementation, the provisioning phase begins with a request from the provisioning application 102 specifying a set of desired managed device states along with information pertinent to each state. A typical example request to provision a managed device, such that it may securely connect to the central authority 108 using a public network, includes the establishment of three states, namely a trust relationship state, a device certificate and root certificates state and a device policy state. Other states that may be provisioned include (but are not limited to) an XML file and a logon script, for example.

Example parameters for domain join may include credentials, target domain, target machine name. For certificates, target certificate template names may be specified; for policy states, group policy may be specified. These parameters are validated to ensure they are appropriate.

For each state requested, the provisioning framework 104 invokes a corresponding one of the provisioning services $106_1$-$106_N$, (e.g., a provisioning service $106_1$ may handle domain join provisioning functionality, a provisioning service $106_2$ may handle certificate provisioning functionality, and so on). In turn, the service $106_1$ establishes the state with the central authority 108, e.g., using an authenticated and encrypted protocol (which may be a network protocol such as LDAP), using states (e.g. a trust relationship) established by preceding services if needed, and returns metadata representing the new state to the provisioning framework 104. Note that the central authority 108 may be provided with target machine (managed device)-related data such that the provisioning service impersonates an actual device, so that, for example, the central authority 108 need not be modified from how it currently works with actual managed devices.

By way of example, the service provider for handling domain join communicates with a domain controller to set up a new machine account, get credentials (which may be existing user credentials on the domain), and so forth. The provisioning framework 104 then copies this state metadata SMD1 returned by the invoked services $106_1$ to a container 110, e.g., the data may be serialized. Each other desired provisioning service $106_2$-$106_N$ is similarly invoked, with the returned metadata from each packaged in a format suitable for storage and transport and returned to the requesting, higher-layer application 102. For example, the certificate service provider creates a certificate template based upon a certificate name and communicates with one or more certificate authorities as appropriate to obtain a machine certificate for the given machine to be provisioned, as well as copy root certificates from its local machine on which the provider runs, and returns this to the provisioning framework 104. The policy provider resolves the names of policies into GUIDs, obtains the corresponding data (e.g., as system database configuration settings), and returns this to the provisioning framework 104. The provisioning framework 104 processes (e.g., serializes) each set of data into the container 110 (described below) for returning to the provisioning application 102.

Decoupled from the provisioning of the states is device configuration based upon the provisioned data, e.g., via a device configuration phase. As described herein, a device configuration application 112 receives the container 110 (which may comprise a container set comprising one or more separate and/or combined containers) from the provisioning application 102 at any appropriate time, and uses the information in the container 110 to provision the managed device 114, e.g., write information into the device storage/system state 116. To this end, a managed device configuration framework 118 provides the device configuration application 112 with an abstract view (via a suitable API set represented by the dashed line) of various underlying configuration services $120_1$-$120_x$ which are each associated with (e.g., coupled to or possibly incorporated into) the managed device 114. Note that the container 110 may be accessed by the device configuration application 112 via a website, emailed or copied to a USB memory device and physically transported to a machine that runs the device configuration application 112, and so forth. Further note that the container can contain a configuration service so that it can be used as needed, and/or a link to a configuration service (if there is an online connection to such a service).

A high-level application, such as the device configuration application 112, determines when and where to access the target device's persisted system state 116. To configure the states on the managed device 114, the device configuration application 112 submits the location of the device's storage/system state 116 and the container 110 to the managed device configuration framework 118. The device configuration framework 118 extracts each state metadata element from the container 110 and invokes a corresponding one of the configuration services $120_1$-$120_x$, e.g., as identified by a GUID in a metadata element in the container 110 corresponding to each provisioning service. For example, the identifier may be that of the provisioning service that provided the data (by which the corresponding configuration service is known), and/or the configuration service that is to be used to unpack and apply the data. Each invoked configuration service in turn applies the information contained in the state metadata to the device's persisted system state 116. Note that the managed device need not be on or in a running state, provided that its storage/system state 116 is accessible to the framework 118/configuration services $120_1$-$120_x$.

At this point the various provisioning states have been established and configured on the device. Applications may use managed device provisioning frameworks to provision and configure arbitrary states singularly, in batches, or in large sets.

FIGS. 2-5 comprise flow diagrams summarizing the example steps corresponding to arrows one (1) through eleven (11) as well as the dashed arrows of FIG. 1. As represented via the arrow labeled (1) in FIG. 1, the provisioning application 102 submits a request which is received by the provisioning framework 104, as represented by step 202. The request may specify parameters such as the type or types of provisioning request, name identifiers, credentials, encryption-related data, and so forth.

At step 204, corresponding to the labeled arrow (2) in FIG. 1, the provisioning framework 104 performs initial validation of the request parameters that the provisioning framework 104 knows how to validate (the selected provisioning services know how to validate other parameters). Via steps 208, 212 and 214, the provisioning framework 104 invokes each of the underlying provisioning services in turn, beginning with a first provisioning server, e.g., provisioning service $106_1$. Note that not every service need be invoked for a given provisioning operation.

Step 302 represents the selected provisioning service validating parameters that it knows how to validate. As represented by step 304 of FIG. 3 and arrow (3) of FIG. 1, the selected provisioning service interacts with the central authority 108 to the extent needed to satisfy its portion of the application's request. Step 306 represents the selecting provisioning service capturing any state metadata SMD1 representing the established device state that is to be provisioned. Step 308 represents packaging the metadata in a format that is suitable for transport, e.g., serializing the metadata, and step 310 returns the packaged data to the provisioning framework, where it is received at step 210 of FIG. 2; this is also represented by the arrow labeled (4) in FIG. 1.

Steps 212 and 214 repeat the process for each other provisioning service to be invoked, until none remain. This is also represented in FIG. 1 via the dashed arrows alongside arrows (2), (3) and (4), that is, the operations represented by arrows (2) through (4) in FIG. 1 for the first selected service (e.g., $106_1$) may be repeated for any other selected provisioning services $106_2$-$106_N$. Note that some or all of such steps may be performed in parallel, e.g., by invoking the selected provisioning services in parallel.

Figure 2:
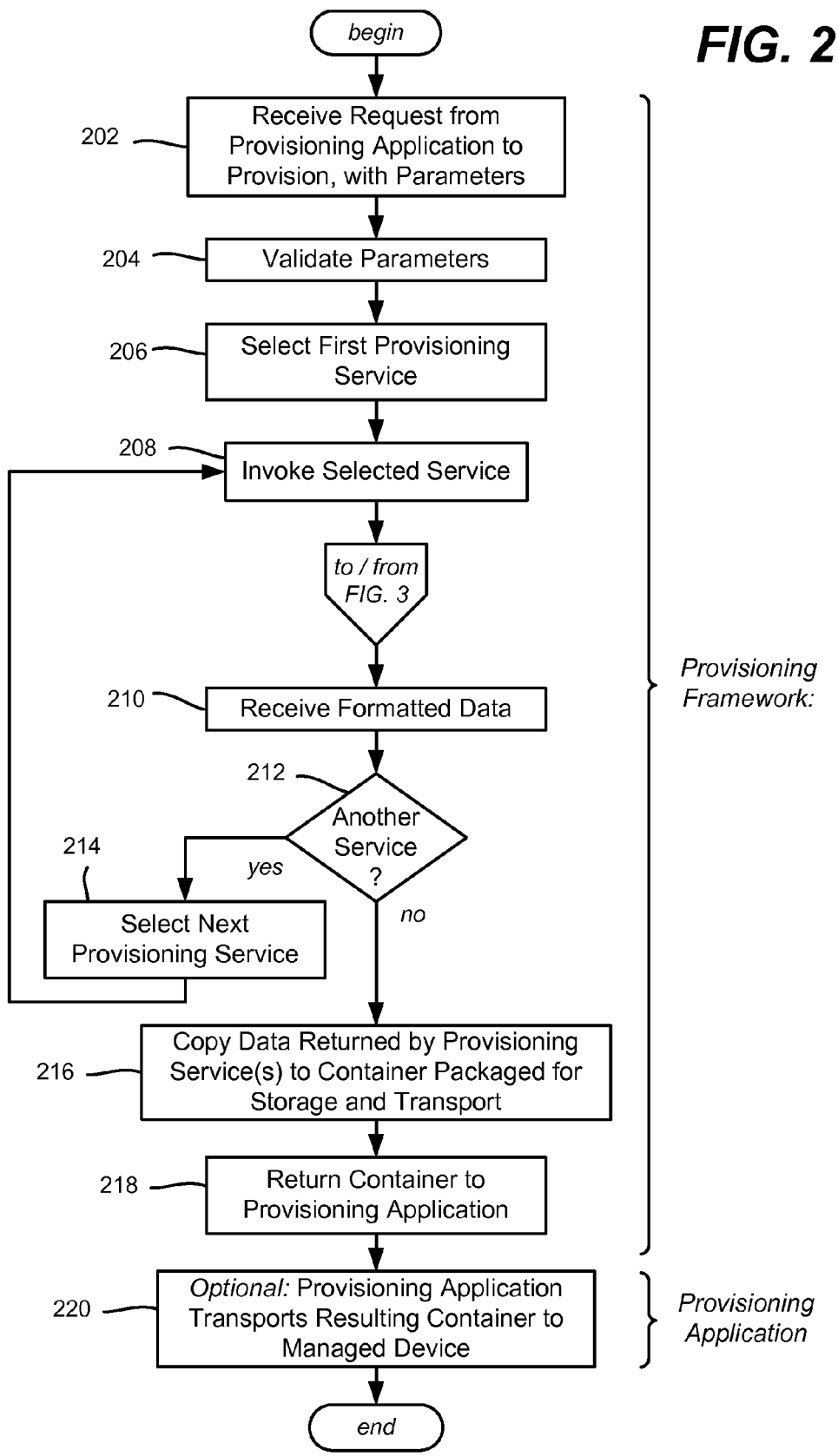
FIG. 2 is a flow diagram representing example steps taken by a provisioning framework to obtain and package provisioning data.

Step 216 of FIG. 2 represents the provisioning framework copying the data returned by each of the invoked provisioning services into a container, which is then packaged in a format suitable for storage and transport. The container is returned to the provisioning application to respond to the request, as represented by step 218 of FIG. 2 and arrow (5) in FIG. 1.

At this time, the provisioning phase is complete in this example, with the provisioned states contained in the container. Step 220 of FIG. 2 (the arrow (6) of FIG. 1) represents the resulting container being transported to the managed device. Note that this is an optional step at this time, as transport may be deferred until any appropriate time. Note further that one or more intermediaries may be involved, e.g., the container may be stored in a location that is accessible to the managed device.

Figure 3:
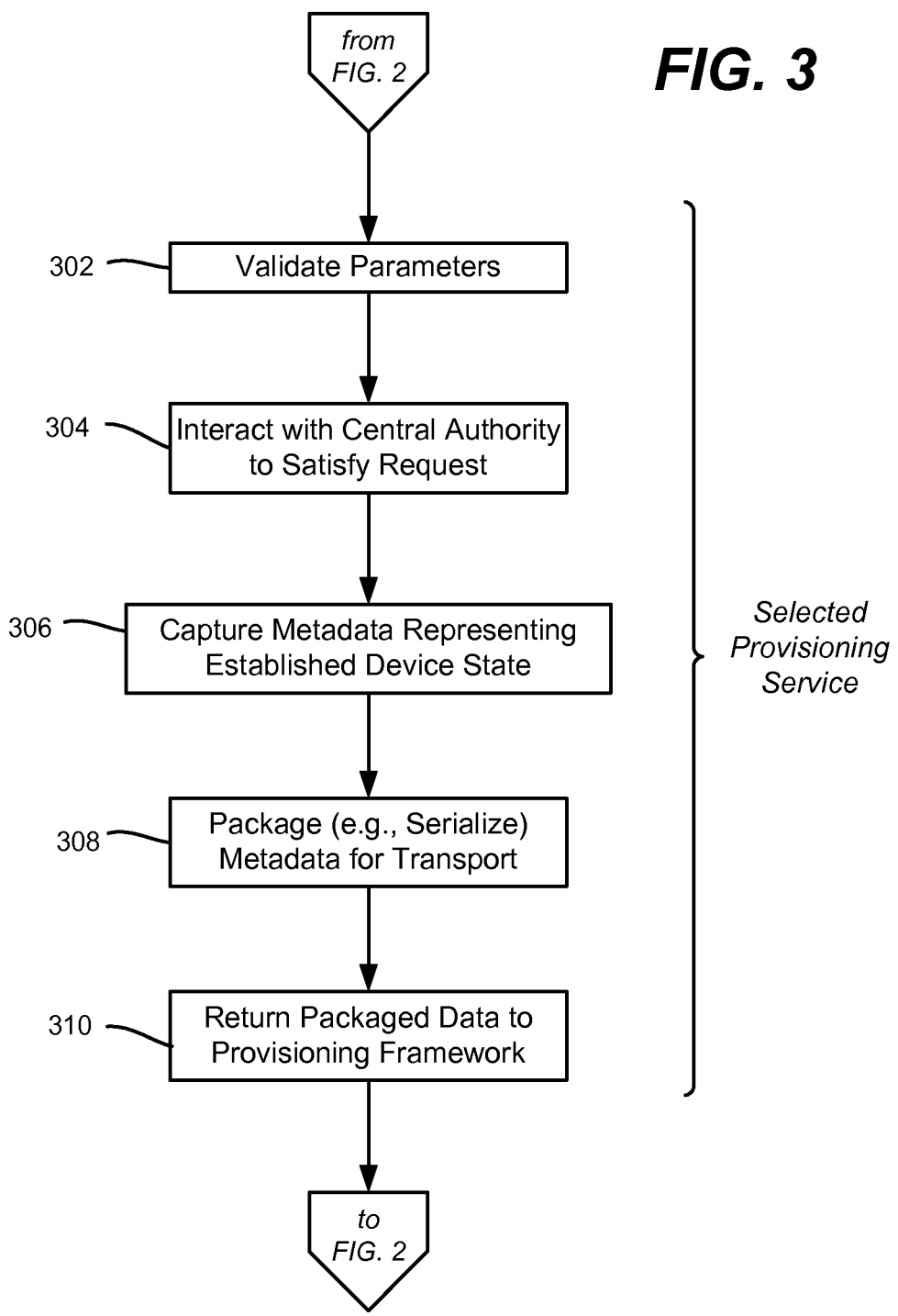
FIG. 3 is a flow diagram representing example steps taken by a provisioning service to return provisioning data to a provisioning framework.
Figure 4:
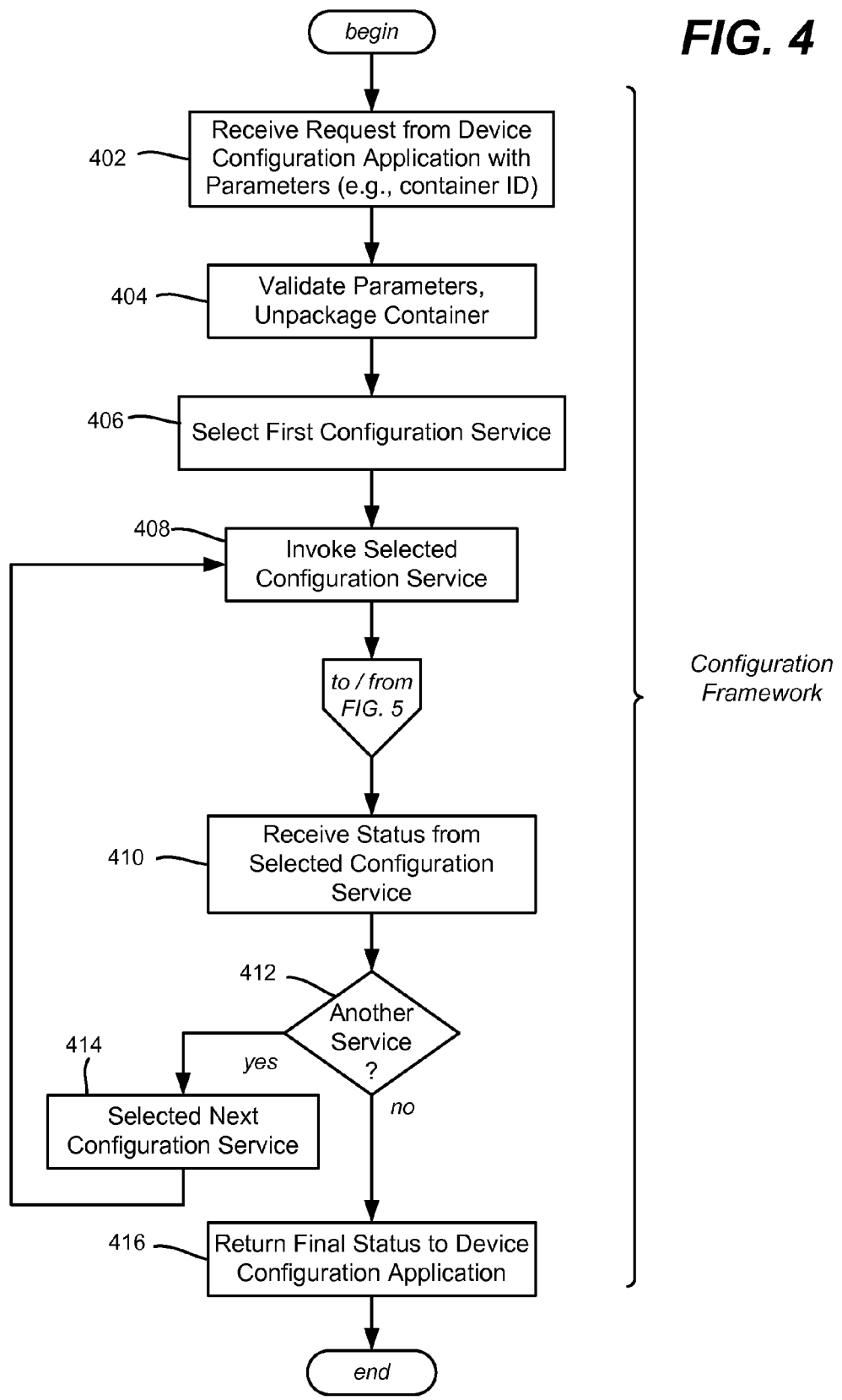
FIG. 4 is a flow diagram representing example steps taken by a configuration framework to access and unpackage packaged provisioning data.

Turning to the decoupled device configuration phase represented by FIGS. 3 and 4 and arrows (7) through (11) in FIG. 1, at an appropriate/desired configuration time, the device configuration application submits a request to the configuration framework, specifying parameters such as the container which holds the provisioning data. The request and receipt of the request at step 404 of FIG. 4 is also represented by the arrow labeled (7) in FIG. 1.

At step 404, the configuration framework performs initial validation of the request parameters and unpackages the container. Via steps 406, 408, 412 and 414, the configuration framework iterates through the elements 1-X in the container, invoking a configuration service corresponding to the type of each element. The first such element-selected invocation is represented via arrow (8) in FIG. 1, (with dashed arrows representing subsequent service invocations).

Figure 5:
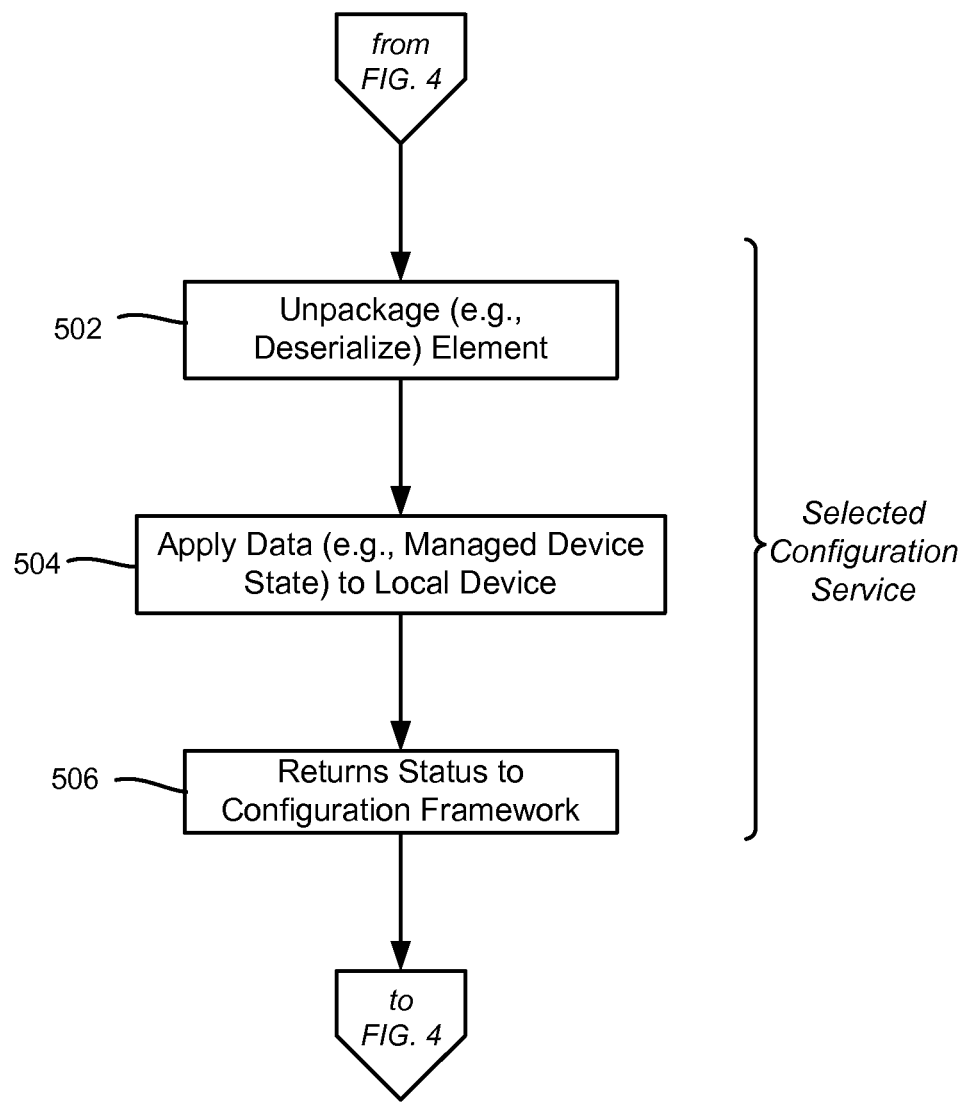
FIG. 5 is a flow diagram representing example steps taken by a configuration service to return provisioning data to a configuration framework.

For each invoked service, the configuration service corresponding to the type of the first container element unpackages (e.g., deserializes) the element at step 502 of FIG. 5. Step 504 represents applying corresponding data (e.g. managed device state) to the device storage/system state of the managed device, which is also represented via arrow (9) in FIG. 1. As represented via the arrow labeled (1) in FIG. 1, the configuration service corresponding to the type of the selected container element returns (step 506) the status of the application to the configuration framework, where it is received as represented via step 410 of FIG. 4. 1 via steps.

As is understood, the steps corresponding to arrows (8) through (10) of FIG. 1 are repeated via steps 412 and 414 of FIG. 4 for any other container elements (2–X). Some or all of such operations may be performed in parallel.

When the invoked configuration services have completed their operations, a final, comprehensive status is returned from the configuration framework to the device configuration application as represented via step 416 of FIG. 4 and arrow (11) in FIG. 1. Assuming there were no fatal errors or the like, the device is now provisioned for subsequent (e.g., at any time in the future) communication with the central authority, including with sufficient state information to securely connect to the central authority over a public network.

It should be noted that containers for provisioning/configuring a machine a first time on a domain are not reusable once used by the machine, because only one machine may use the machine-specific information in the container to join a domain. However, other containers that contain information that is not machine-specific, such as root certificate authority certificates and policy may be used by multiple machines. For example, some packages may have a common set of parts (e.g. a policy part), whereby the creation and use of a package as a template for other packages may promote performance gains and the like. A template package may be passed in as a parameter during package creation, for example, whereby the provisioning framework may manage the part duplication and addition to the new package.

Turning to aspects related to the containers, the data may be arranged as blobs and sub-blobs, e.g., via a RPC (remote procedure call) NDR (Network Data Representation) facility for data serialization (for transport) and deserialization (for consumption). This allows compression and/or encryption as desired.

Figure 6:
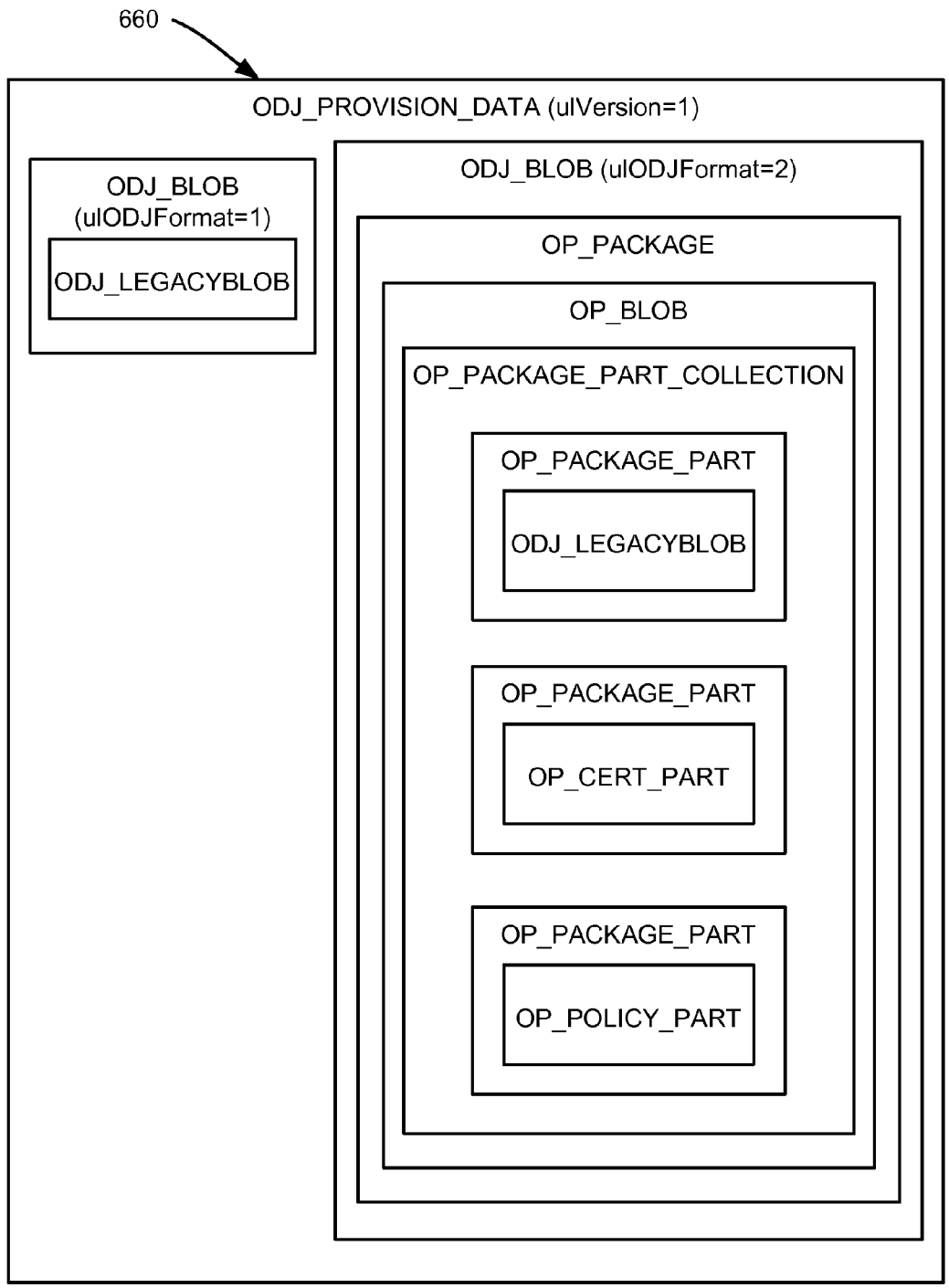
FIG. 6 is a representation of a container data structure showing package parts that contain provisioning data corresponding to states of arbitrary type.
Figure 7:
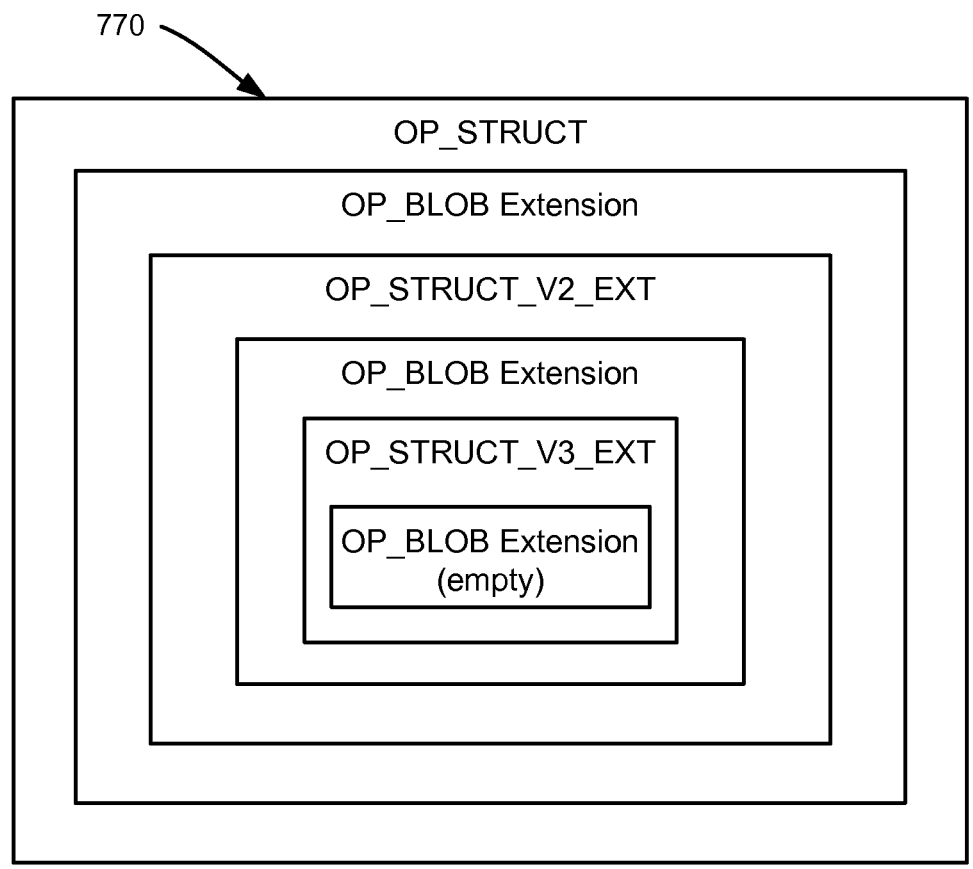
FIG. 7 is a representation of a container data structure showing extensibility of container data.

FIGS. 6 and 7 show container data structures 660 and 770, respectively, that provide down-level compatibility and future extensibility. In general, offline provisioning may use packages, package parts (opaque and provider-specific), and supporting objects. Note the "OP_BLOB Extension" fields in the exemplified data structure 770. Such fields provide an extensibility mechanism for the structures themselves, in a manner that is compatible with down-level, at-level, and up-level consumers. For example, consider a structure OP_STRUCT, introduced in platform version one (V1), which has undergone two extensions (OP_STRUCT_V2_EXT, OP_STRUCT_V3_EXT) in platform versions two and three (V2, V3), respectively. A serialized instance of OP_STRUCT and its extensions, authored on a V3 platform, is represented in FIG. 7.

On the consumption side, assuming no consumer-version range enforcement exists, a V1 consumer is able to deserialize OP_STRUCT, and know that one or more extensions are included. A V2 consumer is able to deserialize OP_STRUCT and OP_STRUCT_V2_EXT, and know that one or more extensions are included. V3 (and later) consumers are able to deserialize OP_STRUCT, OP_STRUCT_V2_EXT and OP_STRUCT_V3_EXT, and know that no other extensions are included.

The container arranged with package parts supports the encryption and decryption of the package part collection. A framework, similar to that of the above-described package part service providers may be used, e.g., encryption/decryption implementations can be "plugged in" and exposed programmatically via a GUID and structure-based parameter sets.

For example, when a request for a new provisioning package is made, a type of encryption to be used may be specified. The request may contain additional encryption parameters (e.g. a public key), or these may be generated dynamically based upon the request context (e.g. an RMS policy generated by the package author). The package part collection is encrypted, and any resulting encryption context (e.g. an RMS policy) is stored in the package in the clear. Serialization of the package is completed, and the serialized package is returned to the author.

After the package is delivered (via any suitable means) to the target consumer, the consumer requests installation of the package, (which may optionally specify a callback routine). If package encryption is detected, the callback routine is invoked and passed the encryption type and encryption context, allowing for the consumer to compose a set of decryption parameters (e.g. a private key, a Windows® Live® ID) and the like as needed. The encryption type, encryption context (if any), and decryption parameters (if any) are used in combination to decrypt the package part collection. Deserialization of the package parts follows, such that the package installation request completes, and any decryption parameters are returned to the consumer for final processing.

The technology described herein may be extended to restore a managed device to its previous state at conclusion of the complete-package-install phase. To this end, service providers may track the changes that are needed to roll back each part that they install, e.g. storing the rollback changes themselves as serialized rollback parts in the device configuration settings database (e.g., Windows® registry). Such parts may be assembled into a rollback package, for example, for subsequent installation in the normal manner to restore the previous system state.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 8:
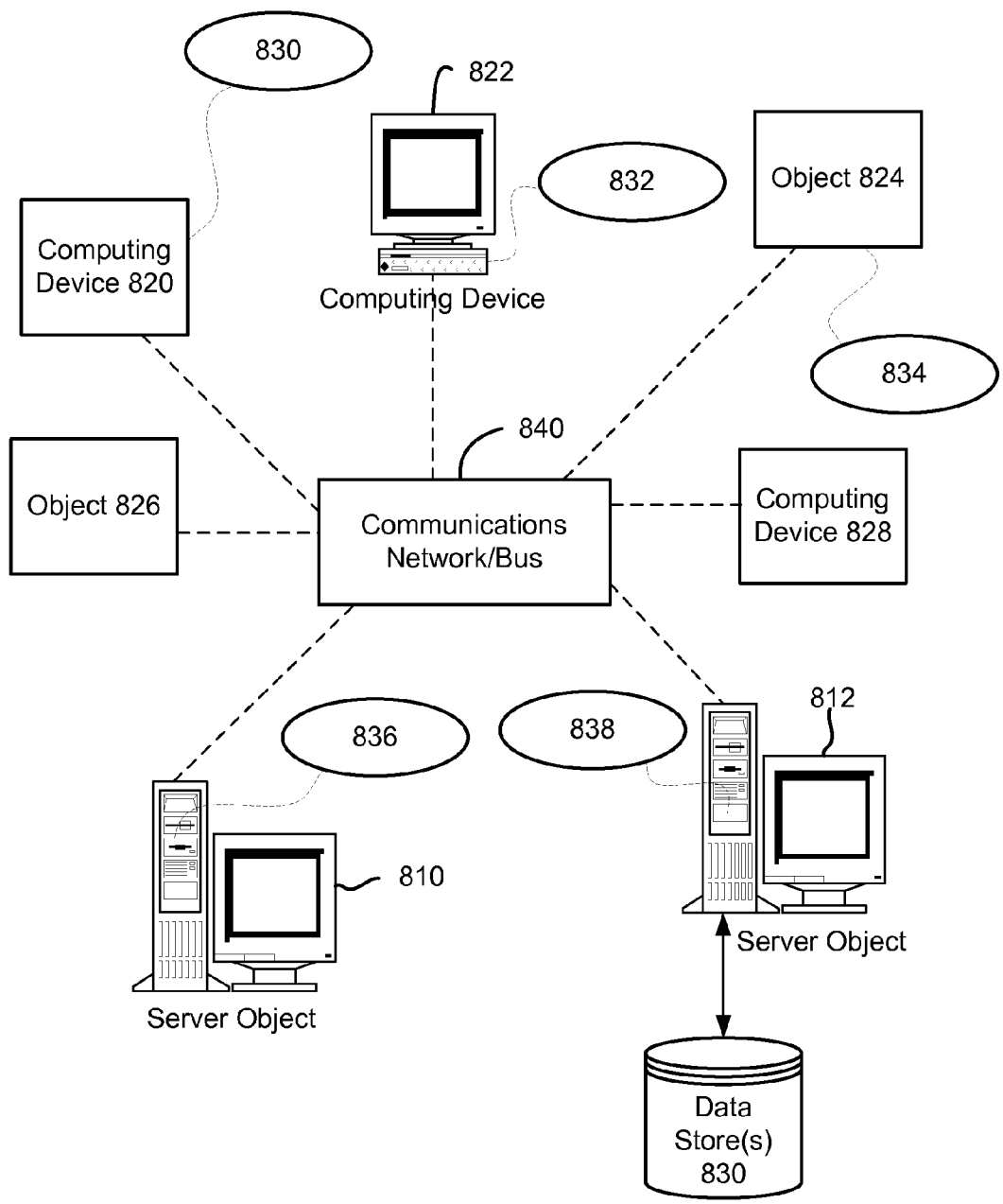
FIG. 8 is a block diagram representing example non-limiting networked environments in which various embodiments described herein can be implemented.

FIG. 8 provides a schematic diagram of an example networked or distributed computing environment. The distributed computing environment comprises computing objects 810, 812, etc., and computing objects or devices 820, 822, 824, 826, 828, etc., which may include programs, methods, data stores, programmable logic, etc. as represented by example applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing object or device 820, 822, 824, 826, 828, etc. can also contain an application, such as applications 830, 832, 834, 836, 838, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc., acting as servers provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 840 or bus is the Internet, for example, the computing objects 810, 812, etc. can be Web servers with which other computing objects or devices 820, 822, 824, 826, 828, etc. communicate via any of a number of known protocols, such as the hypertext transfer protocol (HTTP). Computing objects 810, 812, etc. acting as servers may also serve as clients, e.g., computing objects or devices 820, 822, 824, 826, 828, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
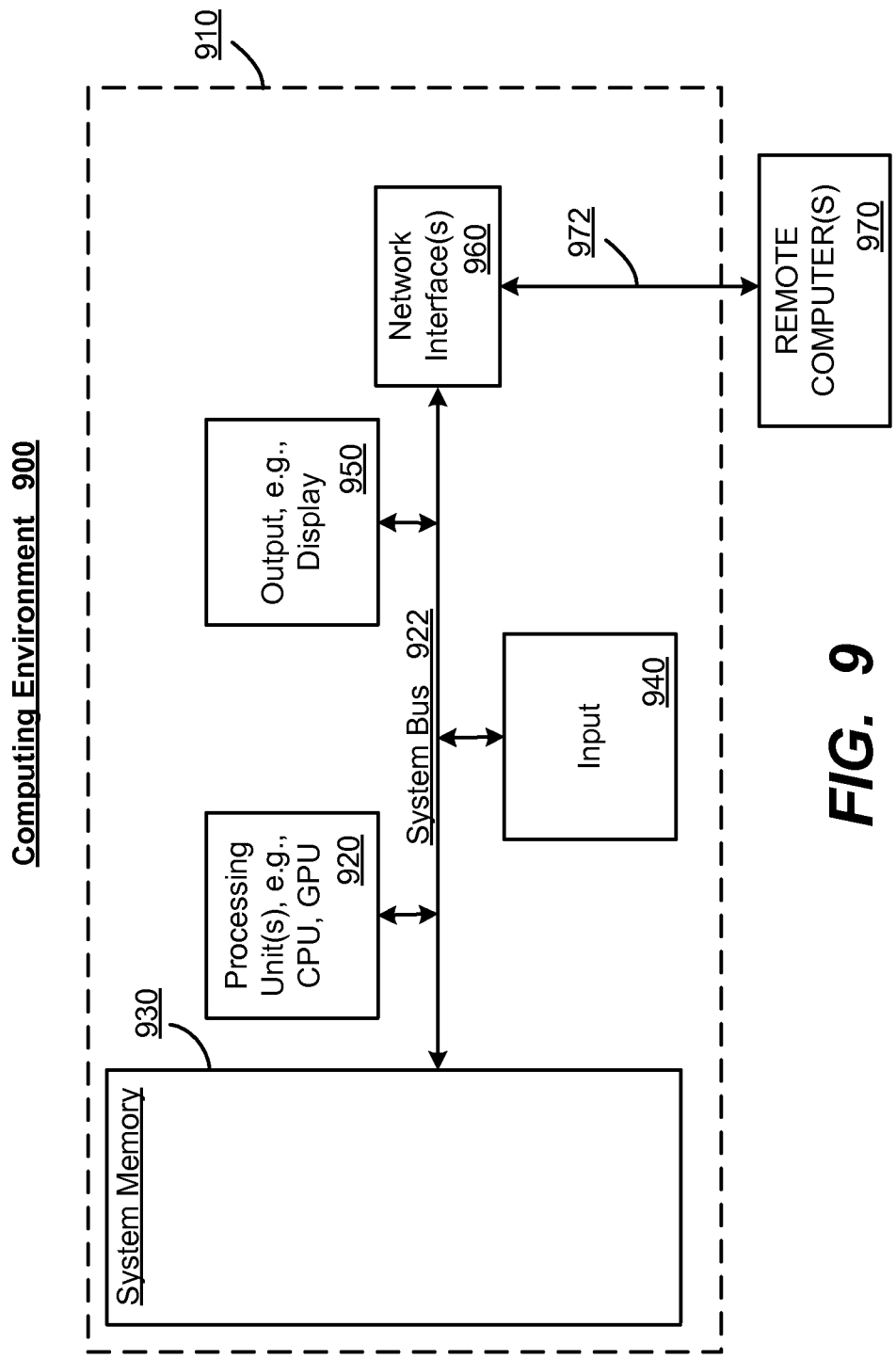
FIG. 9 is a block diagram representing an example non-limiting computing system or operating environment in which one or more aspects of various embodiments described herein can be implemented.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the example computing system environment 900.

With reference to FIG. 9, an example remote device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

For the avoidance of doubt, the subject matter disclosed herein is not limited by any examples. In addition, any aspect or design described herein is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method comprising, receiving a request to provision a target machine for subsequent communication with a central authority, obtaining provisioning data related to the provisioning of the target machine, in which the provisioning data comprises arbitrary state including trust relationship-related data obtained from a trust relationship-related provisioning service, certificate-related data obtained from a certificate-related provisioning service and policy-related data obtained from a policy-related provisioning service, and packaging the provisioning data into a container that is accessible for configuring the target machine without additional communication with the central authority.

2. The method of claim 1 wherein obtaining the provisioning data comprises communicating with at least one provisioning service.

3. The method of claim 1 further comprising, sending a response to the received request that includes the container.

4. The method of claim 1 wherein obtaining the provisioning data comprises communicating with the trust relationship-related provisioning service, the certificate-related provisioning service, and the policy-related provisioning service.

5. The method of claim 4 wherein packaging the provisioning data includes adding data to the container corresponding to an identifier of the trust relationship-related provisioning service, an identifier of the certificate-related provisioning service, and an identifier of the policy-related provisioning service.

6. The method of claim 1 wherein packaging the provisioning data includes comprises adding version information to the container.

7. The method of claim 1 further comprising, accessing the container, unpacking the provisioning data to obtain configuration data, and applying the configuration data to the target machine.

8. The method of claim 1 wherein applying the provisioning data comprises communicating with a trust relationship-related configuration service, a certificate-related configuration service, and a policy-related configuration service.

9. A system comprising, a configuration framework coupled to a managed device, the configuration framework configured to process provisioning data contained in a container, including to invoke one or more configuration services to write state information corresponding to a plurality of states to a device storage of the managed device, including when the managed device is not actively communicating with a central authority, to provision the device for subsequent communication with the central authority, wherein the state information includes trust relationship-related data, certificate-related data, and policy-related data, wherein the trust relationship-related data is in a first package part of the container, the certificate-related data is in a second package part of the container, and wherein the policy-related data is in a third package part of the container.

10. The system of claim 9 wherein the container comprises information that is not machine specific to the managed device and is utilized for multiple managed devices.

11. The system of claim 9, wherein the managed device is restored to its previous state at a conclusion of an installation.

12. The system of claim 9, wherein the container includes at least one part for extended data.

13. The system of claim 9 wherein the managed device comprises a domain machine and wherein the central authority comprises a domain controller.

14. The system of claim 9 wherein the device storage of the managed device is written with the state information while the managed device is not running.

15. The system of claim 9 wherein the container includes one or more identifiers by which the one or more configuration services are invoked by the configuration framework.

16. The system of claim 9 wherein the container includes certificate- related data or policy-related data, or both, that is reusable by a plurality of machines for communicating with the central authority.

17. The system of claim 9 further comprising a provisioning framework configured to package the provisioning data into the container, including to invoke one or more provisioning services to obtain the state information from the central authority or from at least one machine coupled to the central authority, or both from the central authority and from at least one machine coupled to the central authority.

18. The system of claim 9 further comprising a device configuration application coupled through an application programming interface set to the configuration framework.

19. One or more computer storage devices having computer-executable instructions, which when executed perform steps, comprising:
  in a provisioning phase in which a managed device need not be actively communicating with a central authority, obtaining arbitrary state information for provisioning the managed device for subsequent communication with the central authority, and packaging the arbitrary state information in a container, wherein the arbitrary state information includes trust relationship data, certificate-related data, and policy-related data; and
  in a configuration phase that is independent of the provisioning phase, accessing the container, unpackaging the arbitrary state information, and applying state to the managed device to provision the managed device for subsequent communication with the central authority, wherein the trust relationship-related data is in a first package part of the container, wherein the certificate-related data is in a second package part of the container, and wherein the policy-related data is in a third package part of the container.

20. The one or more computer storage devices of claim 19 wherein in the provisioning phase, obtaining the arbitrary state information comprises invoking a plurality of provisioning services, and wherein in the configuration stage, applying the state to the managed device comprises invoking a plurality of configuration services that each correspond to one of the plurality of provisioning services.

* * * * *